(12) United States Patent
Failer et al.

(10) Patent No.: US 12,645,690 B2
(45) Date of Patent: Jun. 2, 2026

(54) DISTRIBUTING TABULAR DATA FROM A RELATIONAL DATABASE OVER THE INTERNET TO A REMOTE SUBSCRIBER COMPUTER

(71) Applicant: Business Mobile AG, Kreuzlingen (CH)

(72) Inventors: Thomas Failer, Kreuzlingen (CH); Joerg Klotzbuecher, Kreuzlingen (CH); Maximilian Ralph Peter von Liechtenstein, Douglas (IM); Florian Kunz, Kreuzlingen (CH)

(73) Assignee: Business Mobile AG, Kreuzlingen (CH)

( * ) Notice: Subject to any disclaimer, the term of this patent is extended or adjusted under 35 U.S.C. 154(b) by 0 days.

(21) Appl. No.: 18/595,571

(22) Filed: Mar. 5, 2024

(65) Prior Publication Data

US 2025/0284701 A1 Sep. 11, 2025

(51) Int. Cl.
*G06F 16/25* (2019.01)
*G06F 16/28* (2019.01)
*H04L 69/04* (2022.01)

(52) U.S. Cl.
CPC .......... *G06F 16/254* (2019.01); *G06F 16/284* (2019.01); *H04L 69/04* (2013.01)

(58) Field of Classification Search
None
See application file for complete search history.

(56) References Cited

U.S. PATENT DOCUMENTS

| | | | | |
|---|---|---|---|---|
| 9,501,550 B2 * | 11/2016 | Zhang | .................. | G06F 16/283 |
| 2002/0104080 A1 * | 8/2002 | Woodard | ............ | G06F 9/44505 |
| | | | | 717/176 |
| 2003/0110085 A1 * | 6/2003 | Murren | .................. | G06Q 30/02 |
| | | | | 705/26.61 |
| 2004/0002988 A1 * | 1/2004 | Seshadri | ................ | G06Q 10/10 |
| | | | | 707/999.102 |
| 2008/0005130 A1 * | 1/2008 | Logan | .............. | H04N 21/25891 |
| | | | | 348/E7.071 |
| 2009/0286509 A1 * | 11/2009 | Huber | ................. | H04L 63/0853 |
| | | | | 455/410 |
| 2009/0288140 A1 * | 11/2009 | Huber | ..................... | G07F 9/001 |
| | | | | 726/2 |
| 2012/0221686 A1 * | 8/2012 | Chadwick | ............. | G06F 16/972 |
| | | | | 709/219 |
| 2013/0019009 A1 * | 1/2013 | Tremblay | ............... | H04N 21/24 |
| | | | | 709/224 |
| 2014/0344936 A1 * | 11/2014 | Thario | ................ | G06F 3/04817 |
| | | | | 726/25 |

(Continued)

*Primary Examiner* — Khanh B Pham
*Assistant Examiner* — Navneet Gmahl
(74) *Attorney, Agent, or Firm* — Quisenberry Law PLLC; C. Dale Quisenberry

(57) ABSTRACT

Methods are described herein related to extracting tabular data from a transmission server to a remote subscriber computer in a setting wherein the tabular data can only be transferred in a textual representation over an Internet connection, such as a web service, for example. An architecture based on parallel processing may speed up the extraction process by separating iteration from data processing and by introducing forward and reverse iterators for iterating a table from two ends simultaneously.

1 Claim, 12 Drawing Sheets

(56)         References Cited

U.S. PATENT DOCUMENTS

| | | | |
|---|---|---|---|
| 2015/0293980 A1* | 10/2015 | Dola ...................... | G06F 21/60 |
| | | | 726/26 |
| 2018/0027006 A1* | 1/2018 | Zimmermann ..... | H04L 63/0227 |
| | | | 726/11 |
| 2018/0165139 A1* | 6/2018 | Kolodzieski .............. | G06F 8/60 |
| 2020/0034216 A1* | 1/2020 | Kolodzieski .............. | G06F 8/60 |
| 2021/0344723 A1* | 11/2021 | O'Neil .................. | G06F 21/604 |
| 2022/0092135 A1* | 3/2022 | Sidman .............. | G06Q 30/0273 |
| 2022/0360663 A1* | 11/2022 | Kempson .......... | H04M 3/42306 |

* cited by examiner

DISTRIBUTING TABULAR DATA FROM A RELATIONAL DATABASE OVER THE INTERNET TO A REMOTE SUBSCRIBER COMPUTER

BACKGROUND OF THE INVENTIONS

1. Field of the Inventions

The document relates to distributing tabular data from a source relational database over a network to a remote subscriber computer. More particularly, this patent specification relates to iterating through tabular data on an application server and transferring the iterated data from a binary format to a textual format suitable for transmission over a web service to the Internet. The patent specification also relates to methods suitable for speeding up the extraction process and for increasing the rate of data throughput by separating the iteration task from the formatting and data compression tasks.

2. Description of the Related Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

Data extraction is the process of collecting data from various sources for the purpose of transformation, storage, or feeding it to another system for subsequent analysis. The sources through which this data is extracted may be structured or unstructured. With structured data, the data adheres to a specific form or schema, for example, a database table comprising tabular data with clearly defined columns of a particular data type and values contained in rows. Tabular data stored in a relational database, hosted by a relational database management system, is commonly extracted via a query language which is interpreted by the relational database management system. SQL is the most common of such query languages. Tabular data comprises tables, whereas each table generally contains one or more data categories logically arranged as columns or fields in a viewable schema. Each row or record of a table contains an instance of data for each category defined by the fields. For example, a database may include a table that describes a customer with fields for basic contact information such as name, address, phone number, fax number, etc. Another table might describe a purchase order, including fields for information such as customer, product, sale price, date.

A use case is when a remote database is extracted from subscriber computer over the internet, whereby transmission of the extracted data is only possible through a generic web service, such as SOAP or a REST API, as opposed to a native database driver or a binary database access protocol such as ADO or ODBC. For transmission over a web service generally tabular data has to be converted from binary format and formatted in textual format, such as CSV, XML or JSON format. An additional use case is when on the transmission server, which is tasked with binary to text conversion, no native database access is possible. Such as when all database access is only possible through a logical layer, hosted on an application server.

An example of application layer database access is given with common enterprise resource planning systems, such as SAP ERP ECC 6.0 for example. Such systems store multiple logical relational tables in one single physical table on the underlying database management system und such systems also use proprietary data compression and/or encryption in order to obfuscate the data stored in the underlying physical tables. As a result the logical data model can only be queried with an application layer interpreted query language such as OpenSQL, which is a proprietary query language introduced by SAP SE. The OpenSQL interpreter then translates the input OpenSQL statements into native database level SQL statements and it also de-obfuscates and/or decompresses the tabular data payload such that as a result the tabular data is returned in the logical form, i.e. the form that is human readable.

Those skilled in the art know that when extracting an entire table from a logical database, realized on an application server, then this table is iterated line by line, top to bottom in a single work process. The data is also formatted at the same time, so that a table line is read in binary format, translated to text format and then output as text format, and only after the output step the iterator jumps to the next line. The extraction is finished once the iterator has reached the last line of the table. It is also known in the art that it is useful to use data compression on the output textual representation of the extracted tabular data before transmitting it over the Internet to a remote subscriber computer, for example by means of a web service.

SUMMARY OF THE INVENTIONS

The claimed invention addresses the Internet-centric challenge of efficiently extracting tabular data from an application layer hosted logical database and transmitting the extracted data to a subscriber computer when there is the complication that the data can only be transmitted as a text format (which may be data compressed) over an Internet connection.

The prior art sometimes speeds up transfers of tabular data from relational databases, whether logical databases hosted on a application server or physical database hosted on a database management system, through assigning a dedicated work process per table. So, if the task were to extract three tables from a database, for example, then three separate work process would iterate each table top to bottom, whereby top and bottom are commonly defined as per a primary key ascending sort order. The limiting factor would be how long it takes to iterate the largest table, whereby largest may mean the most number of rows or the most amount of data. Unfortunately in many enterprises resource planning (ERP) systems it is a common fact that the largest tables are exponentially larger than other tables. In a typical ERP system there are over 100,000 tables and yet 90 percent of data tends to be situated in the 10 largest table, where the single most largest table may be 10 times larger or more than the second largest table. The present inventors have realized that it is therefore desirable to use parallel processing for large tables. The problem faced by those skilled in the art is that a table iteration may not be split into packages because a table iteration is a task which in the prior art can only be accomplished in a serial manner as opposed to parallel.

The present inventors have found, however, that the Internet centric problem of having to format the binary tabular data as text in order to enable transmission to a remote subscriber computer, may be addressed in a parallel fashion. The prior art invariably outputs the extracted data in the same work process as the table iterator. The present inventors have found that by separating iteration from formatting and/or compression and/or output, then significant performance gains can be achieved, especially when constrained by a low speed internet connection. Large table extraction which would sometimes takes months or even years to complete, can thus be accomplished orders of magnitude faster, such as in a matter of mere hours.

In an embodiment of the invention one work process simply iterates the largest table top to bottom and delegates any formatting, data transfer, data compression or disk-write operations to separate work processes. Hence for this embodiment the limiting factor is reduced to how fast the largest table in the database may be iterated from top to bottom.

In another embodiment large tables are iterated from both ends simultaneously with a separate work process for the top-to-bottom iterator and a separate work process for the bottom-to-top iterator. As long as the table is static, in the sense that no new rows are appended during the iteration process, then the middle of the table can be determined with precision. From the middle of the table suitable stop points can the set for both iterator. The result is that a table is iterated from both ends simultaneously and that the iterators know when to stop, i.e. when the middle of the table is reached, for which the stop points are proxies.

In another embodiment the work processes which are spawned by the iterator work processes compress the extracted data in such a way that output to disk is optimized. If a field in an extracted table row is empty, but the field has a very big nominal length, such as a VARCHAR(MAX) data type on Microsoft SQL Server for example, then disk write speed may soon become a limiting factor, if data packets are formatted as fixed width text fields. On the other hand, prior art approaches, such as formatting the output textual data in a common format such as Anso-CSV (comma separated text with fields encapsulated in quotes and quotes in field contents having to be escaped) have other drawbacks, in particular the pose a significant drain on processor resources because the output needs to be parsed and extensively processes. An innovative approach by the inventors involves a text format mathematically optimized for fast transmission over a low speed internet connection, whereby the text format itself requires only minimal processing of the transmitted data. The inventors have created a format which combines an innovative mixture both fixed length output and delimiter separated fields. In this way all fields which are not of variable length are prepended as fixed length text fields on each line. This is followed, on the same line, by all variable length text fields, which are delimiter-separated. All delimiter separated fields need to ensure that the delimiter character is escaped, which is not a requirement for the prepended fixed-length fields. In this way the inventors have allowed for an advantageous combination of output formats in order to minimize both disk write requirements and processor performance requirements.

In another embodiment the inventors have introduced a novel step of dual compression, whereby a first compression is effected in one of the iterator-spawned secondary work processes and a second compression is effected when combining a plurality of outputs from said first compression into a second compression, in the context of a tertiary work process. This step is advantageous because it minimizes data size for transmission over a low bandwidth internet connection, whereas in contrast the first compression is useful for maximizing the amount of data written to a disk. Both goals benefit from different types of compression, and hence the inventors have separated the compression task, which is handled as a unitary task by the prior art into separate novel steps.

There has thus been outlined, rather broadly, some of the features of the disclosed technique in order that the detailed description thereof may be better understood, and in order that the present contribution to the art may be better appreciated. There are additional features of the techniques that will be described hereinafter and that will form the subject matter of the claims appended hereto. In this respect, before explaining at least one embodiment of the techniques in detail, it is to be understood that the techniques are not limited in their application to the details of construction or to the arrangements of the components set forth in the following description or illustrated in the drawings. The techniques are capable of other embodiments and of being practiced and carried out in various ways. Also, it is to be understood that the phraseology and terminology employed herein are for the purpose of the description and should not be regarded as limiting.

In one aspect, the present inventions may include a method of distributing tabular data from a source relational database over a network to a remote subscriber computer, the method comprising: providing a database extractor application to a subscriber for installation on the remote subscriber computer: preparing transmission packets at a transmission server wherein said packets comprise tabular data from one or more relational tables sourced from a source relational database, the transmission server comprising a microprocessor and a memory that stores the remote subscriber's preferences for a destination address and for a set of tables subject to extraction, wherein the microprocessor counts a total number of records in a source table, wherein said source table is comprised in said one or more relational tables, iterates said source table, wherein a primary key sort order is used for iterating, spawns a plurality of secondary work processes, wherein a secondary work process is spawned when said iterating has iterated through a predetermined number of records, and wherein said spawning comprises passing a binary representation of said records to said secondary work process, wherein said secondary work process: formats said binary data packet as text, resulting in a formatted data packet: compresses one or more formatted data packets into a transmission packet, and transmits the transmission packet over an Internet-protocol communication channel to a connected device associated with the subscriber computer based upon the destination address: wherein receipt of a transmission packet causes the database extractor application to: extract contents of said transmission packet to a destination table in a destination relational database.

Other features, aspects and advantages of the present inventions will become apparent from the following discussion and detailed description.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

Figure 1:
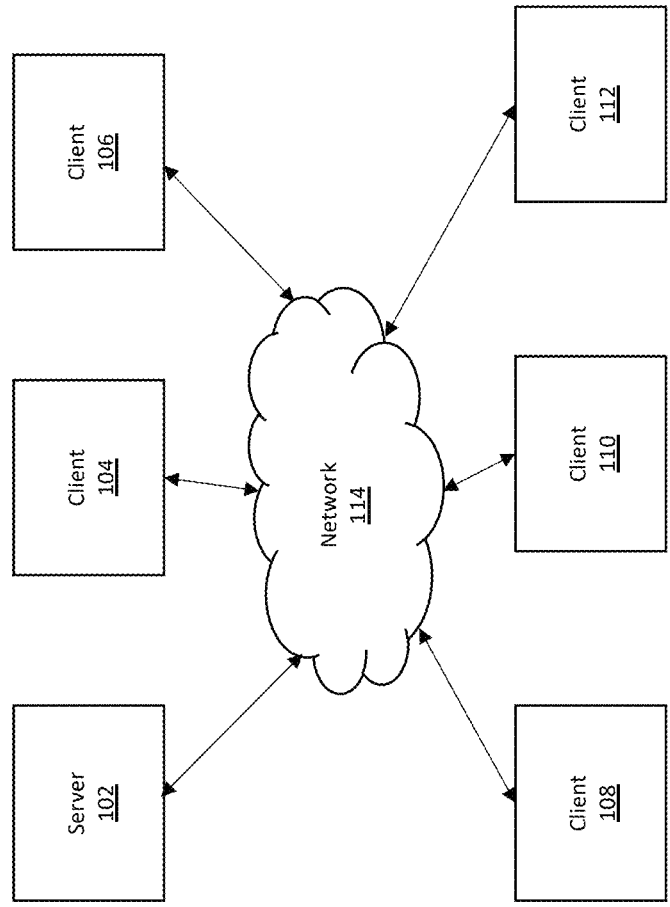
FIG. 1 illustrates a schematic view according to prior art.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

As will be appreciated by one skilled in the art, aspects of the present inventions may be embodied as a system, method or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit." "module" or "system" Furthermore, aspects of the present inventions may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 2:
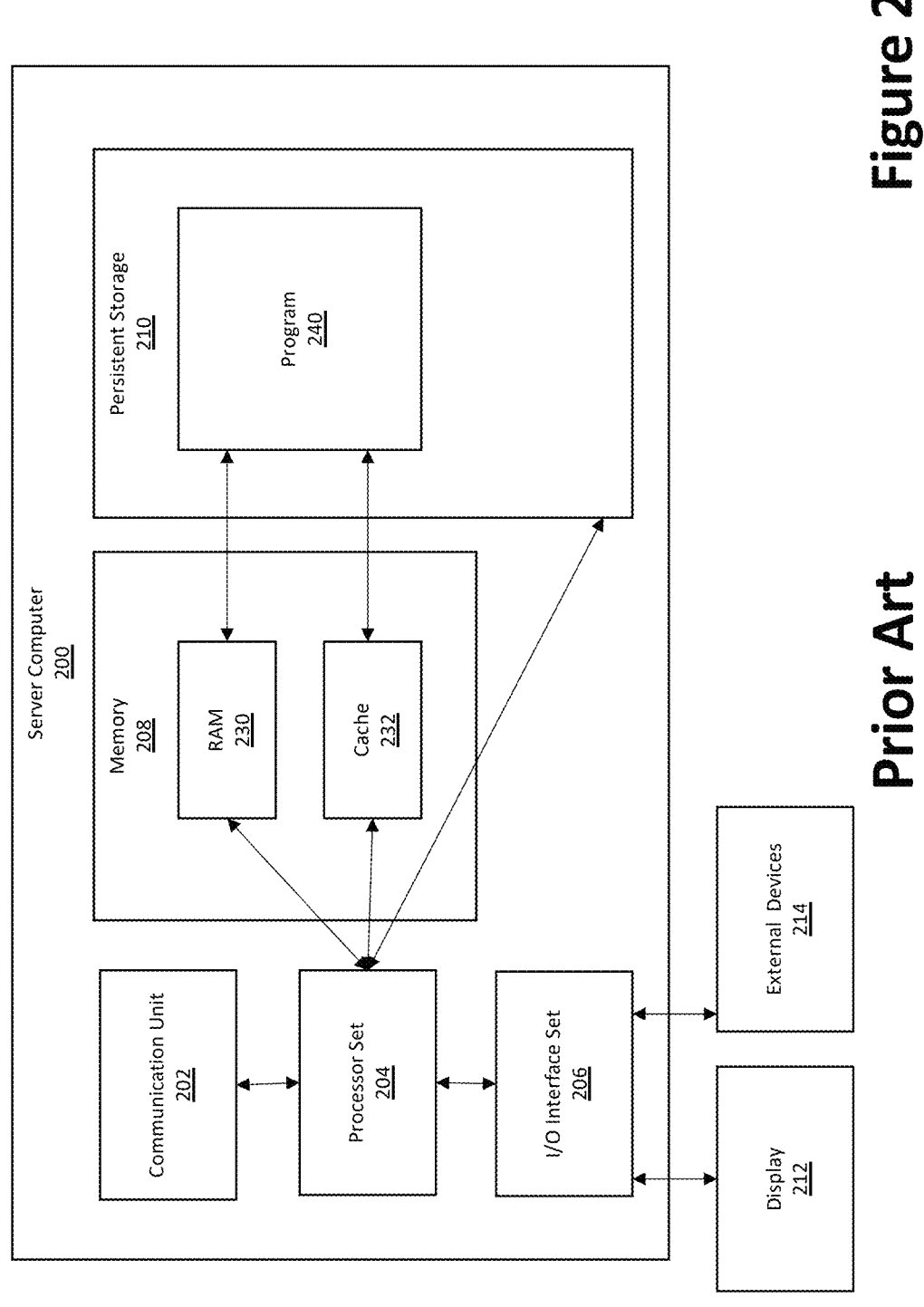
FIG. 2 illustrates a schematic view according to prior art.

An embodiment of a possible hardware and software environment for software and/or methods according to the present inventions will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present inventions. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data that is used to create, manage and control certain software functions that will be discussed in detail, below.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and do not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the program on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the inventions. However, it should be appreciated that any particular program nomenclature herein is used merely for convenience, and thus the inventions should not be limited to use solely in any specific application identified and/or implied by such nomenclature.

The flowchart and block diagrams in the following Figures illustrate the architecture, functionality, and operation of possible implementations of systems, methods and computer program products according to various embodiments of the present inventions. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
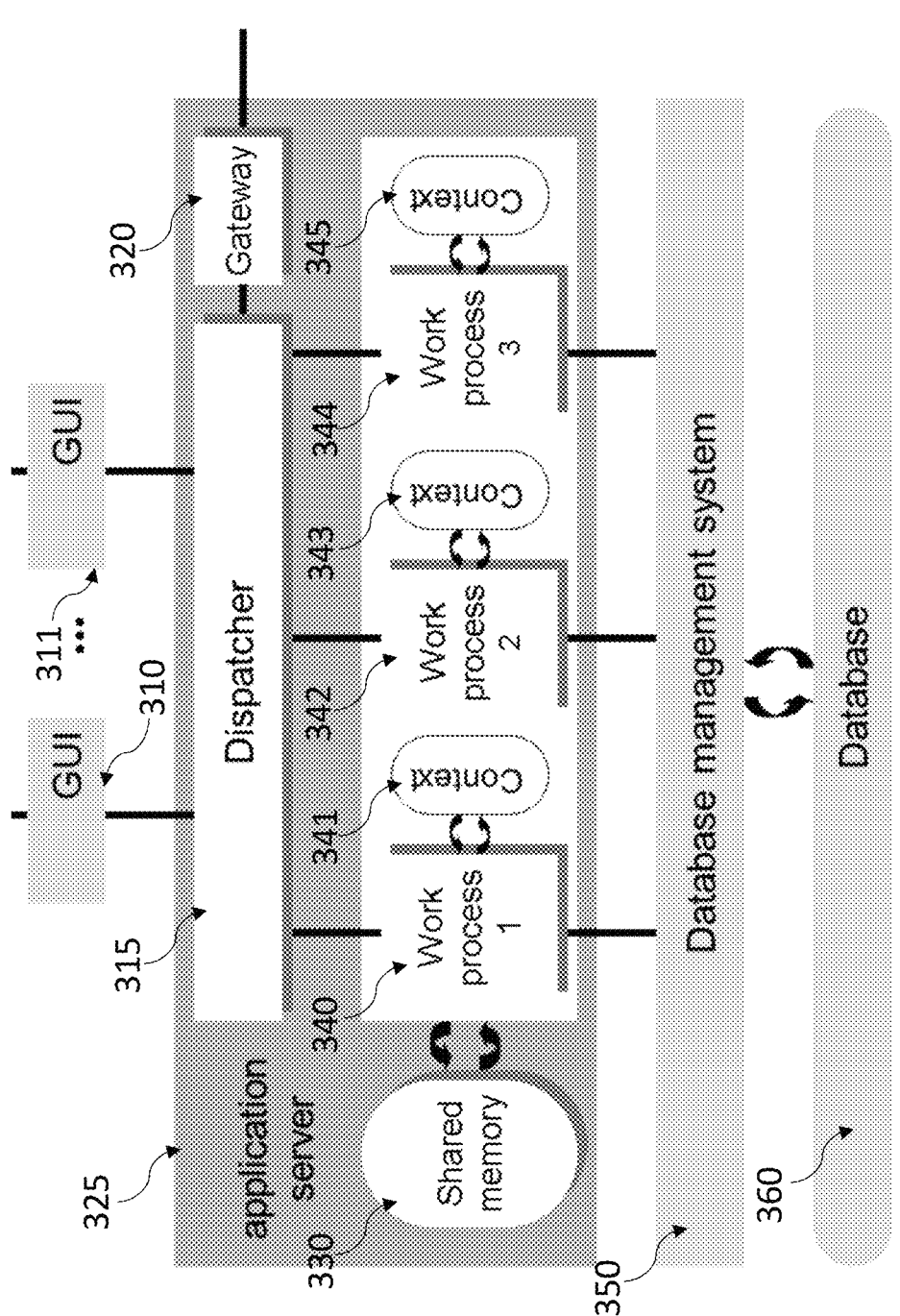
FIG. 3 illustrates a schematic view according to prior art.

FIG. 3 is a schematic diagram depicting an example of an application server architecture for practicing the invention. In an example embodiment an ABAP application server of type SAP ECC6.0 has been used.

All ABAP application servers 325 represent the application layer of the multi-tier architecture of an ABAP-based SAP System. These application servers execute applications and communicate with the presentation components 310 311, the database 360, and also with each other.

Work processes 340 342 344 are components that are able to execute an application. Each work process is linked to a memory area containing the context of the application being run. The context 341 343 345 contains the current data for the application program.

The dispatcher 315 is the link between the work processes and the users or remote subscribers logged onto the application server.

The gateway 320 is the interface for the communication protocols. It can communicate with other application servers.

All of the work processes on the application server may use a common main memory area called shared memory 330 to save contexts or to buffer constant data locally.

The resources that all work processes use (such as programs and table contents) are contained in shared memory. Memory management ensures that the work processes always address the correct context, that is the data relevant to the current state of the program that is running. A mapping process projects the required context for a dialog step from shared memory into the address of the relevant work process. This reduces the actual copying to a minimum.

When starting up, each application server may register its work processes with the database management system (DBMS) 350, and receives a single dedicated channel for each. While the Application Server is running, each work process may be a a user (client) of the database system management (server). The DBMS in turn is used to connect to the database 360. An application server framework is a service layer model. It includes software components available to a software developer through an application programming interface. An application server may have features such as clustering, fail-over, and load-balancing. The goal is for developers to focus on the business logic.

Figure 4:
FIG. 4 illustrates a schematic view according to an embodiment of the present inventions.

FIG. 4 is a schematic diagram illustrating an innovative improvement in the art of preparing a database table extract for text format-based transmission over the internet. An Internet centric problem is that in order to transport extracted tabular data over an internet connection the data has to be converted from binary format to a text-based format, such as JSON, XML or CSV for example. This is frequently a requirement when transporting data over web-service to remote client computers. Prior art solutions iterate one table with a maximum of one work process, or alternatively thread, and these solutions process the binary to text conversion and an output of the text, either to file or for direct transfer to the remote network computer. Under normal circumstances an iteration is faster than readying the extracted data for transmission over a remote network. Hence it is advantageous to separate iteration from data processing. It is also advantageous to deploy two iterators per table as long as the database table is read-only during the extraction and as long as a table count is available. With two iterators one iterates in a primary key ascending order and the other iterator iterates in a primary key descending order. Both iterators meet in the middle of the table and stop iterating at this point. The middle of the table 450 can be calculated by dividing the table row count by two and rounding to the nearest integer. Both the forward iterator 400 and the reverse iterator 490 extract tabular data in packages of an arbitrary size in terms of a number of rows. The forward iterator comprises packages 420, 421, 422, 423, 424 and 425, whereas the reverse iterator comprises packages 440, 441, 442, 443, 444 and 445. Each time an iterator has iterated through a package size of table records a new parallel work process, or alternatively a thread, is spawned. In the specific example, the forward iterator has spawned work processes 410, 411 and 412, whereas the reverse iterator has spawned work processes 413, 414 and 415. In a preferred embodiment the respective work processes produce text formatted data-compressed output files, such as 401, 402, 403, 404, 405 and 406. The text format may be JSON, XML or CSV, for example. Data compression may be achieved with applying the ZIP, GZIP or 7Zip algorithms to the text-formatted data, for example.

Figure 5:
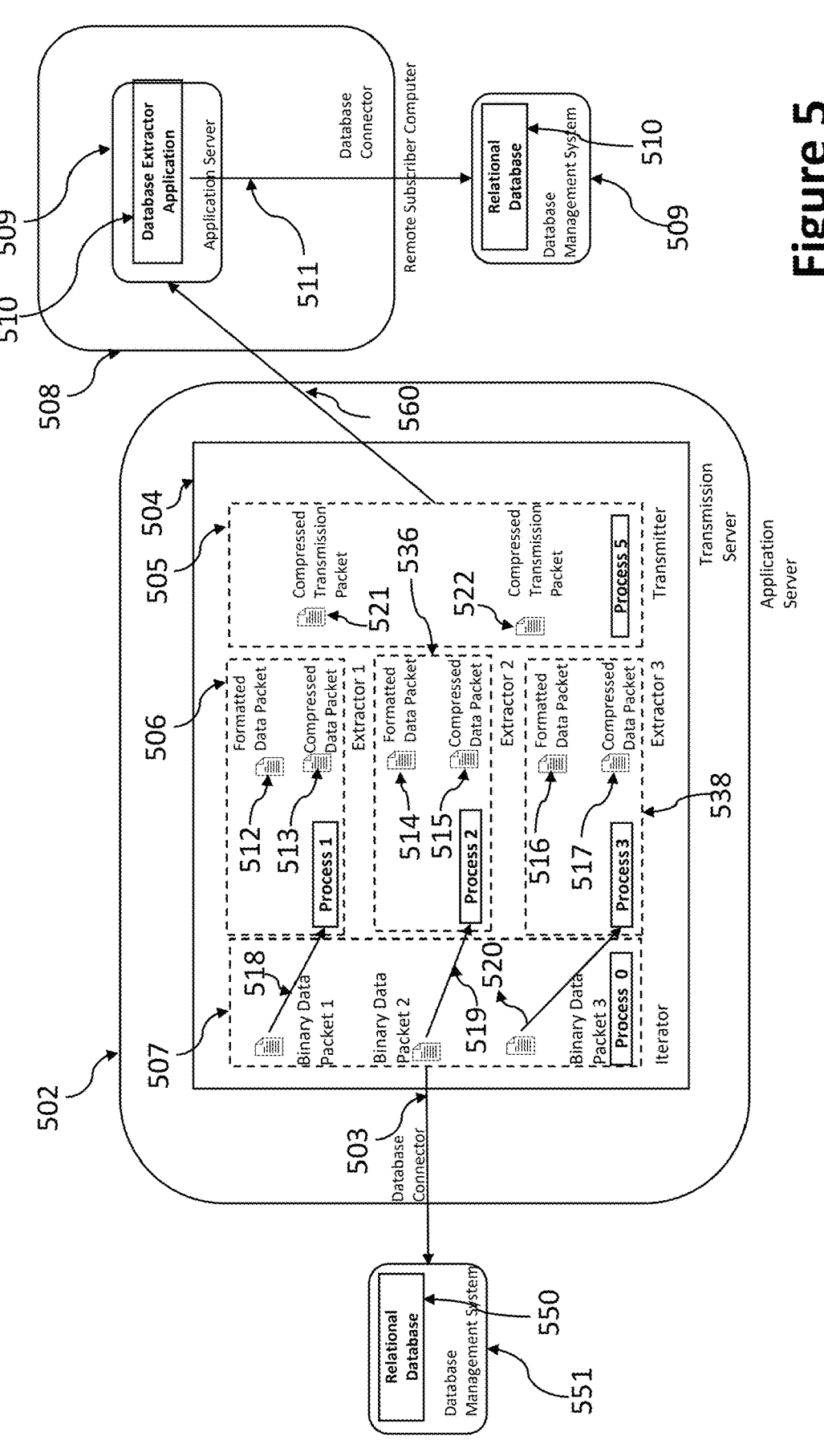
FIG. 5 illustrates a schematic view according to an embodiment of the present inventions.

FIG. 5 is a schematic diagram depicting an example embodiment of a remote subscriber computer 508 requesting an extract of tabular data from a relational database 550, whereby the extracted data is transmitted to the subscriber computer through an Internet protocol type connection 560, such as an HTTP or FTP protocol connection for example, whereby the extracted data may be packaged as a collection of data compressed text formatted files, or alternately wherein the extracted data may be packaged as data compressed text formatted data in a web service interface, such as REST or SOAP. The subscriber computer 508 may be connected to a transmitter work process 505, which in turn is hosted by a transmission server 504, whereby the transmission server represents the server counterpart for the remote subscriber computer 508 in the context of a client-server paradigm. The transmission server represents a logical grouping of components dedicated to serving data to the remote subscriber computer. The transmission server is hosted on an application server 502. An application server is a server that hosts applications or software that delivers a business application through a communication protocol. In an example embodiment a SAP Netweaver application server was used in conjunction with a SAP ERP installation based on version SAP ECC6.0. The invention may be practiced with other alternative application servers provided parallel processing with multiple worker threads and/or multiple work processes is supported. A plurality of interconnected application servers may alternatively be used, whereby an iterator work process 507 may distribute extraction work packets to other work processes 506, 536 and 538. The other work process may be hosted on the same application server, or they may reside on secondary, interconnected application servers. An extraction of one table of relational database 550, may be accomplished with either one iterator, programmed to iterate a table from top to bottom, or it may be accomplished with two iterators, one programmed to iterate a table from top to middle and the other from bottom to middle. The relational database 550 may be accessed via a database connector 503 to a database management system (DBMS) 551. A DBMS is a software system that enables users to define, create, maintain and control access to the database. The database connector 503 is a standard application programming interface (API) for accessing database management systems. In an example embodiment a Microsoft SQL Server DBMS was used with the Open Database Connectivity (ODBC) API serving as the database connector. An iterator may collect the binary contents of a pre-defined number of table rows into a binary data packet 518, 519 and 520. The binary data packets are passed through to dedicated worker processes, or alternatively threads. The passing may be accomplished by passing a cached binary record set as a function parameter to a remote procedure call for example and in a preferred embodiment. Alternatively the passing may be accomplished by writing the data contained in the binary data packet to a binary file on a file system, whereby a dispatcher module may scan for such files and dispatch them to the said work processes. Work processes 506, 535 and 538 may translate a binary data packet which they have received from a iterator work process into a formatted data packet, whereby a binary representation of a record set is translated into a text based data packet 512, 514 and 516, such as a CSV file for example or a fixed-length field file. Such a file need not be written to a file system, but can be stored temporarily in memory as an interim step. In a preferred embodiment formatted data packets are subjected to an in-memory conversion to a compressed data packet. This is especially advantageous whenever a fixed length field (FLF) output format is used, whereby FLF output is used in a preferred embodiment, due to the inherent advantage that a binary to FLF conversion requires only a minimum of processing power, as opposed to outputting to a delimiter-based output format, such as CSV, XML or JSON. This FLF advantage is outdone, however, when output is written to disk, because of the excessive number of bytes which have to be written by a disk write head with typically only limited throughput in comparison to RAM. By using a suitable data compression algorithm, such as 7ZIP, GZIP or ZIP before committing data packets to disk, optimum efficiency can be achieved taking both the advantages of fast FLF formatting and committing only relatively compact file sizes to disk due to efficient data compression. Hence in a preferred embodiment the formatted data packets are translated in memory to compressed data packets 513, 515 and 517. In a preferred embodiment the compressed data packets may be written to the file system for further processing by a transmitter 505 work process. However alternatively the extractor work process may instead bypass the file system and interface directly with the database extractor application 510 on the remote subscriber computer 508. The transmitter 508 is a work process or thread which, in a preferred embodiment, is looking for files which have been produced by the extractor work processes and which have been deposited on a shared location on a file system. In other embodiments the transmitter may receive the extractor output files in memory, such as a function parameter in a remote procedure call for example. The transmitter is tasked with collecting the extractor produced output files and transmitting them to the remote subscriber computer, such as via the HTTP or FTP Internet protocols for example. In an innovative departure from the prior art the inventors have introduced dual step compression. In a preferred embodiment the extractor output is already data compressed, such as by 7ZIP or GZIP, when the transmitter work process further processes compressed data packets. However, the extractor outputs are compressed in such a way that enables fast disk write speeds, not fast Internet transfer. These two goals are not mutually exclusive, but since Internet transfer normally is orders of magnitude slower in terms of byte transfer rates, then compression becomes more important. As such it may be useful to combine a plurality of compressed data packets into a compressed transmission packet. A combination will yield increased transfer speed since the dictionary used in data compression will be larger, in the sense that the rate of data compression is proportional to the size of the compression dictionary, which in turn is proportional to the size of the input file for the data compression. The database extractor application 510 may be implemented as a client server application, with an Internet type connection to the remote transmission server 504. In a preferred embodiment the extractor application is implemented as an application written in JAVA and deployed on an Apache Tomcat application server 509. The remote subscriber computer may be interconnected to a relational database 510 hosted on database management system 509, Microsoft SQL Server in one embodiment, and connected to the database extractor application via a database connector 511, which is a JDBC connection in an example embodiment.

Figure 6:
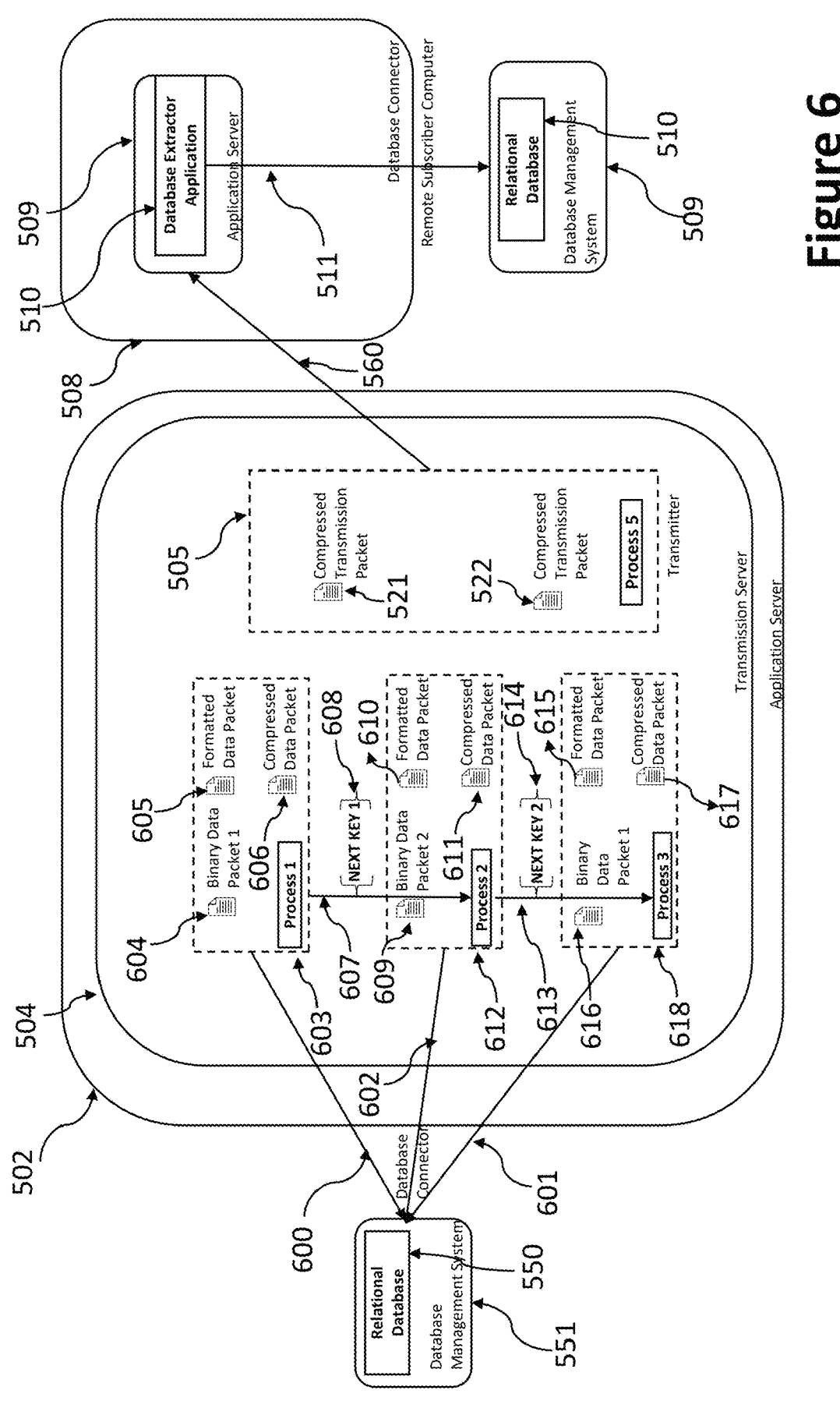
FIG. 6 illustrates a schematic view according to an embodiment of the present inventions.

FIG. 6 is a schematic diagram depicting an alternative embodiment of the principles outlined in FIG. 5. A key difference is that the alternative embodiment does not make use of a separate iterator work process and as such the extractor work process are not given binary cached record sets as input parameters. Instead, iteration is handled by the iterator work processes themselves. However, the way the iteration is implemented departs from prior art approaches. The extractors are calling themselves recursively and are giving as an input parameter for each call a start key. The start key of the called work process is the same as the primary key of the last iterated row of the calling work process. Each work process 603 612 618 may be configured to extract the binary data 604 609 616 from a package of a pre-defined number of rows from a table in the source relational database 550, starting at the primary key which may be transmitted as an input parameter 608 614 and up to the iteration end point which is delimited by reaching either the package size limit, or alternatively the end of the table. Each work process of the described embodiment may have its own database connector 600 601 602. Each work process may be configured to produce, following package size iteration and binary data packet production, a formatted data packet 605 610 615, followed by a compressed data packet 606 611 617. If no input key is given, then an extractor work process may assume that an iterator may need to be started at the top of the table, whereby the top may be defined as the first row when sorted by primary key ascending. In order for the performance advantage to materialize it is desirable that the extractor work process make the iterative call to the following work process such as 607 613 at the earliest opportunity, which is before any extracted data is formatted, compressed, written to file or transmitted over the Internet. In this way the table is iterated in a similar way speed as when having a dedicated iterator work process, but when iterating there will be a number of trailing work processes which still have unfinished work with regards to the aforementioned formatting, compression or data output tasks. The transmitter and the following components in this embodiment are the same as already described in FIG. 5 and hence the same numerals are used to denote same components.

Figure 7:
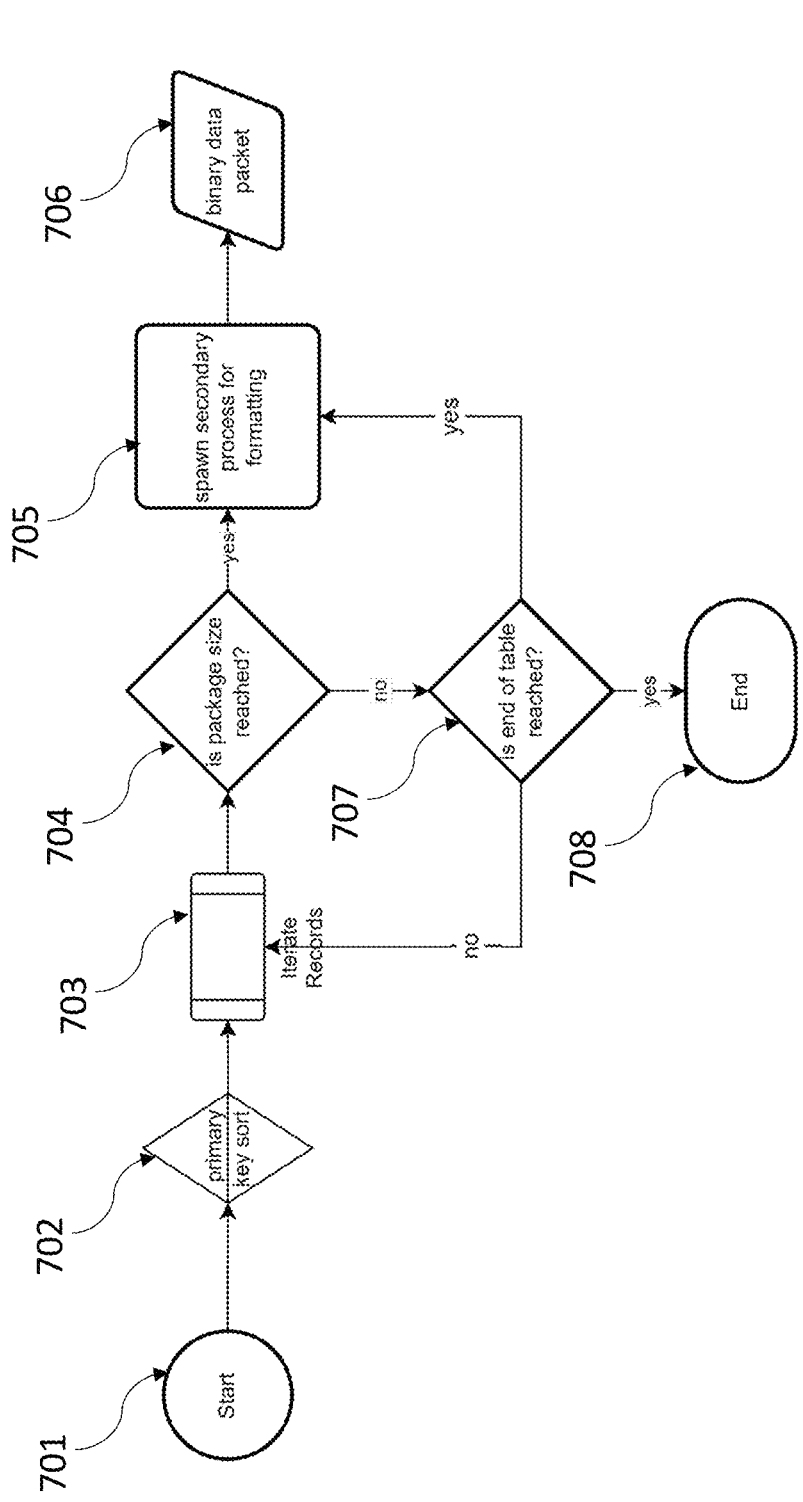
FIG. 7 illustrates a flow chart according to an embodiment of the present inventions.

FIG. 7 is a flow chart depicting a table iteration according to the principles of the invention. The table iteration is modelled on the process flow of the iterator component 507 (FIG. 5). Coinciding with a start of the flow 701 a table to be extracted is sorted according to primary key 702. The primary key sort may be ascending or descending, with ascending order used in a preferred embodiment. Next an iteration of records 703 is started. An iteration may be commenced by giving a SELECT statement in SQL syntax to an underlying database management system for example, such as "SELECT*FROM [TABLE] ORDER BY [PRI-MARY KEY] ASCENDING" for example. For each itera-tion a test may be carried out whether either a predetermined package size is reached 704 (such as 50 records for example) and whether the end of the table is reached 707. Reaching the end of the table means that the flows ends 708. If the package size limit is reached, or if the end of a table is reached, then a secondary process for formatting may be spawned 705. When a secondary work process is spawned then a binary data packet 706 may be passed as an input parameter, such as an argument for a remote procedure call for example. Such binary data packet may be an in-memory representation of a record set, such as a cached record set for example. The size of such a binary record set may be either the pre-determined package size of a defined number of rows, or the remainder from the end point of the last packet to the end of the table, if smaller.

Figure 8:
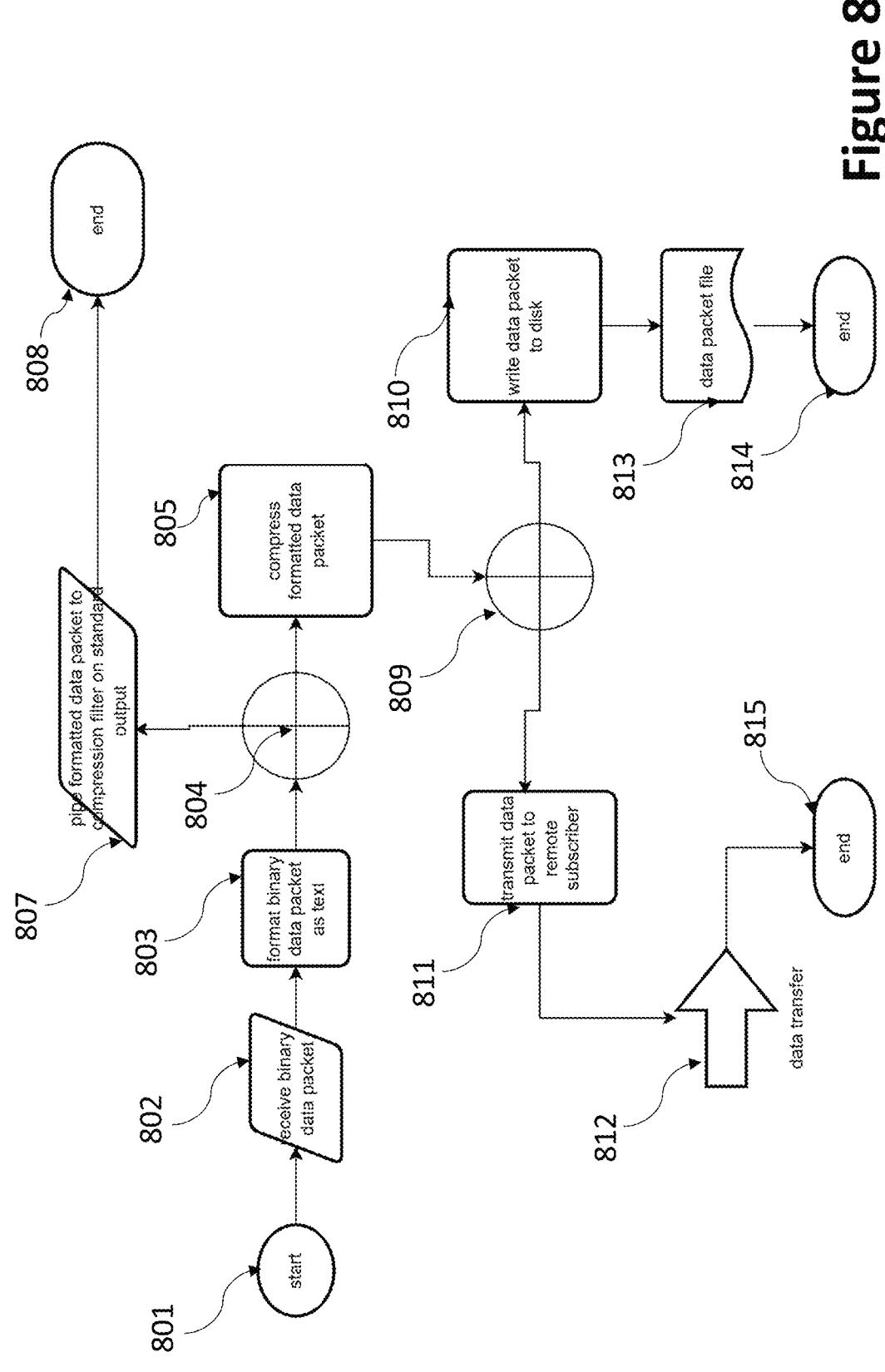
FIG. 8 illustrates a flow chart according to an embodiment of the present inventions.

FIG. 8 is a flow chart depicting a process flow which may take place in a secondary work process, such as depicted earlier in FIG. 7 705. The flow starts 801 by receiving a binary data packet 802, whereby said data packet may be a cached record set such as a JAVA javax.sql.rowset. Cached-RowSet in a preferred embodiment. The next step 803 formats the binary data packet as text, which may be a data structure containing fixed-length fields (FLF), delimited fields (such as CSV) or a text-based structure such as JSON or XML formats. Other text-based formats are also possible, in particular hybrid formats which may combine fixed-length and delimited fields in one format. The next step is an OR condition 804 whereby as one alternative the formatted data packet may be a UNIX-type pipe whereby a formatted data packet is directed to a compression filter on a standard output. The OR condition signifies a branching between alternative embodiments. The alternative leading to 807 constitutes a preferred embodiment. In this way no inter-mediate file has to be written to disk containing uncom-pressed formatted text. Using a pipe is characterized by the circumstance that the pipe target, in this case a compression filter, is normally executed in a process or memory space on operating system level in the sense that resource allocation for the pipe-mediated compression filter is outside the boundary or control of the application server. After handling over a data packet to pipe processing 807 an end condition 808 is reached. Alternatively to pipe processing, compres-sion of the formatted data 805 may be handled by the secondary work process itself, which is the case in a preferred embodiment. This step is followed by another OR junction 809. The OR condition signifies a branching between alternative embodiments. The alternative leading to 811 constitutes a preferred embodiment. One alternative may be to transmit 812 the data packet directly to the remote subscriber 811, which then ends 815 the flow of the sec-ondary work process. The other alternative is to write the compressed data packet to disk 810, creating a data packet file 813, where the file can subsequently be picked up by a distinct transmitter work process for further processing and for transmission to the remote subscriber computer. This again ends the flow 814.

Figure 9:
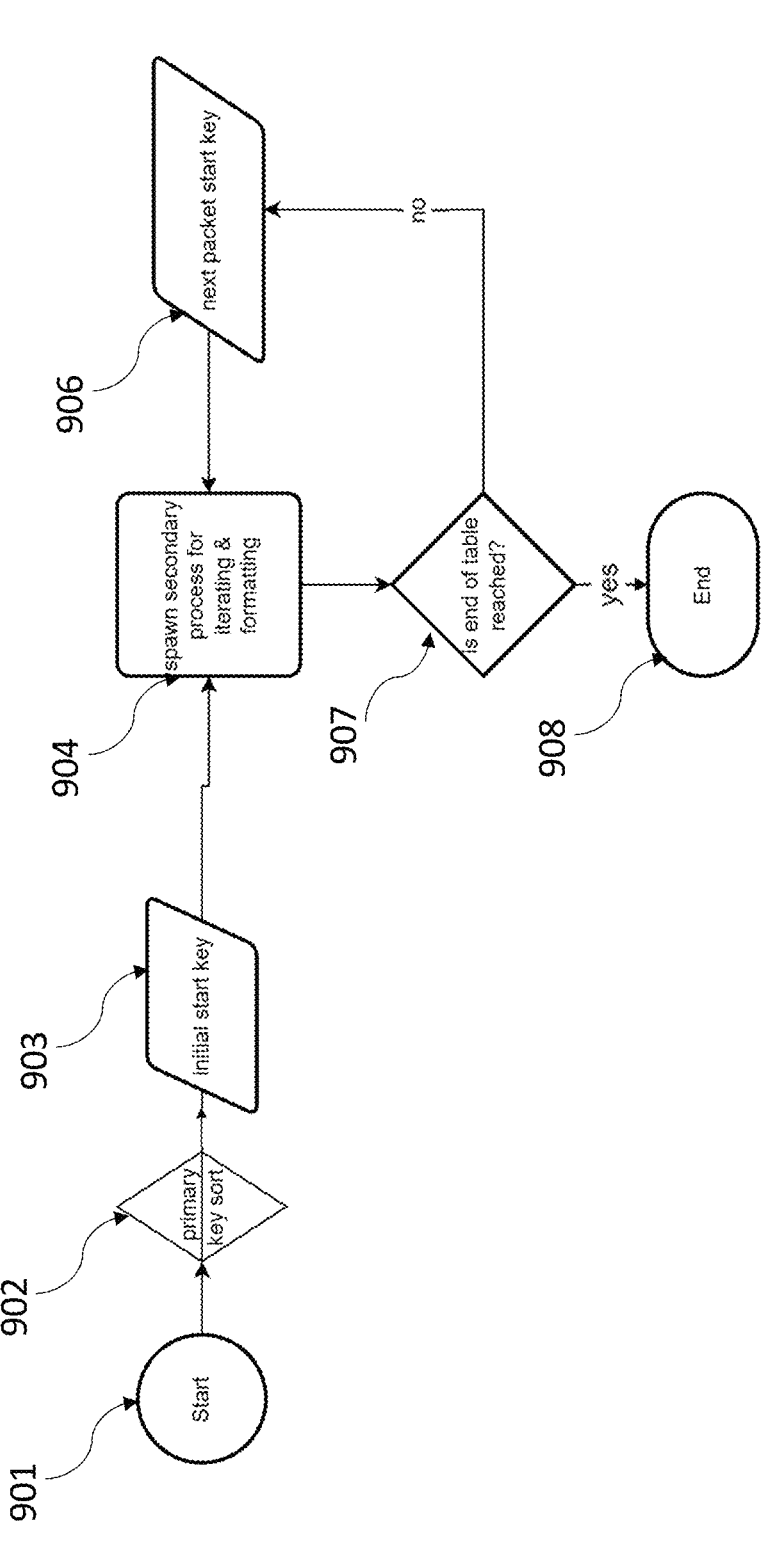
FIG. 9 illustrates a flow chart according to an embodiment of the present inventions.

FIG. 9 is a flow diagram depicting an alternative process flow as depicted in FIG. 7. In particular the depicted process flow is related to the schematic diagram of FIG. 6. The flow start 901 may be followed by a primary key sort of the table to be extracted. Such primary key sort may be in ascending order or in descending order, whereby ascending order is used in a preferred embodiment. Next an initial start key is prepared 903. An initial start key may either be the key of the first row in a sorted table, or it may be a null value which may act as an implicit signal to the following process that the first row in the sorted table needs to be the starting point. This is followed by spawning a secondary process for iterating and for formatting 904. The said initial start key may be given as an input parameter to a remote procedure call for example. The secondary work processes may form a type of recursive cascade, whereby a secondary work process may spawn another secondary work process until such time as the end of the table is reached 907 which would also end the flow 908. If the end of the table is not reached, then the primary key of the last iterated row may become the start key for the next packet 906 which is then passed to the next secondary process 904 which is part of iterative chain.

Figure 10:
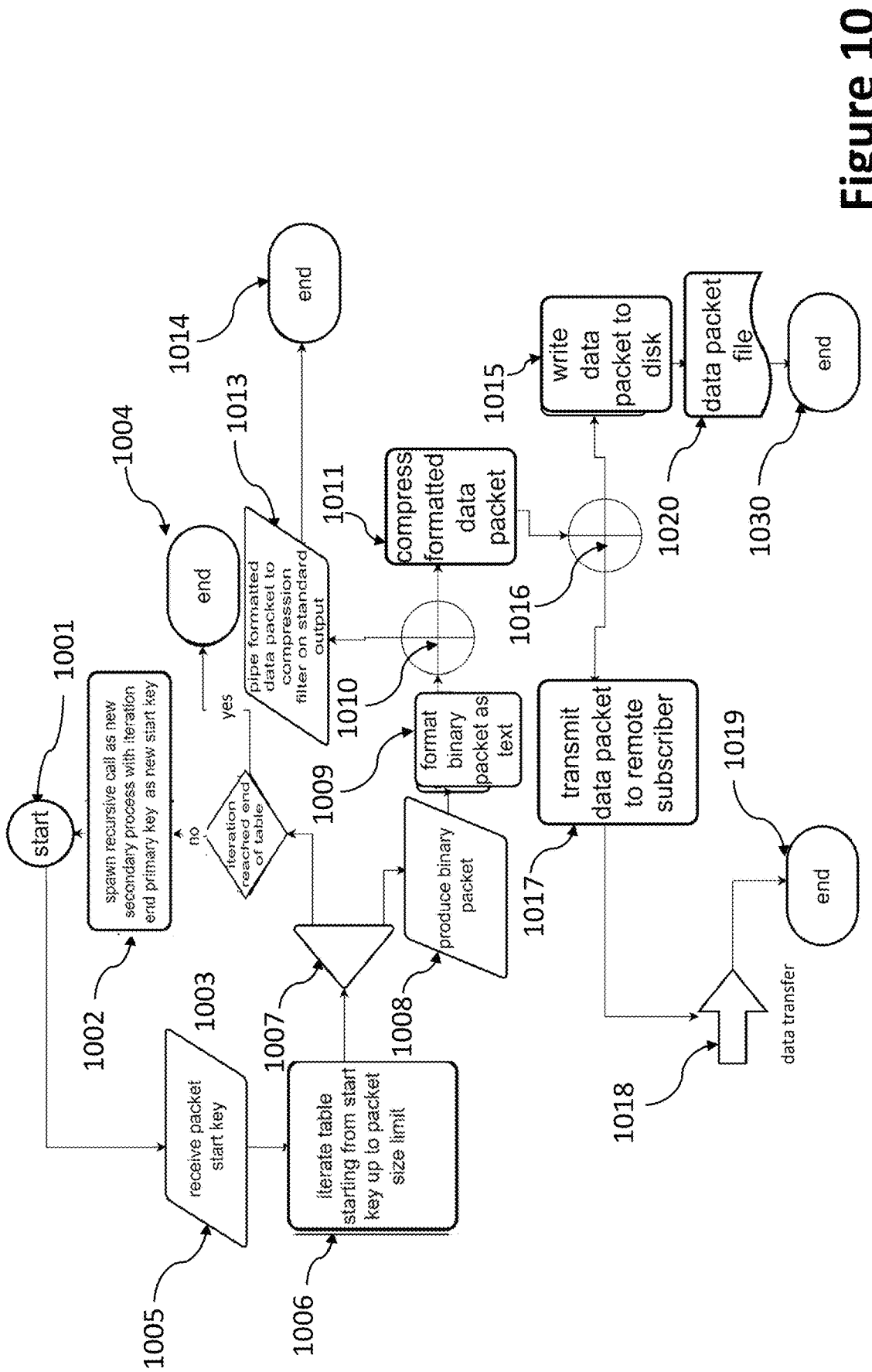
FIG. 10 illustrates a flow chart according to an embodiment of the present inventions.

FIG. 10 depicts a flow chart wherein the process flow is related to the secondary process which depicted in FIG. 9. The flow starts 1001 when a packet start key 1005 as received, such as with an input parameter for a remote function call for example. The next step 1006 may iterate the table to be extracted starting from the start key, in terms or primary key based sort order, up to a pre-determined pack-age size limit. In an innovative departure from prior art a junction 1007 is inserted into the flow. The junction may be implemented with parallel processing, in a preferred embodiment. If parallel processing is not desirable, then serial execution may also be possible. In case of serial execution it is desirable and advantageous that the step 1003 and following are executed before step 1008 and following. Step 1003 is configured to test whether the iteration has reached the end of the table. If that is the case then this branch of the process flow comes to an end 1004. If the end of the table has not yet been reached, then a recursive call is spawned for a new secondary process with the current iteration end key as a new start key 1002. This in turn starts the flow anew 1001. The aforementioned junction 1007 also produces a binary packet, whereby a binary packet is a binary representation of an extracted packet of rows, such as a cached row set, which is implemented as a JAVA javax. sql.rowset. CachedRowSet in a preferred embodiment, or for example, as an ABAP type internal table. The following step 1009 formats the binary data packet from the preceding step into a text based representation, such as an XML string or a JSON string for example. Other text formats capable of a textual representation of collection of table rows are also possible. This step is followed by an OR junction 1010. The OR condition signifies a branching between alternative embodiments. The alternative leading to 1013 constitutes a preferred embodiment. One possible alternative is step 1013 which involves piping a formatted data packet to a com-pression filter on standard output, which then ends that flow 1014. Another alternative for junction 1010 is to compress the formatted data packet. In further processing there is OR junction 1016, which may as one alternative write the formatted and compressed data packet to disk 1015, result-ing in a data packet file 1020, which ends that flow 1030. The OR condition 1016 signifies a branching between alternative embodiments. The alternative leading to 1017 constitutes a preferred embodiment. As another alternative 1017 the formatted and compressed data packet is transmitted directly to the remote subscriber computer 1017 as part of a data transfer 1018 which is common achieved with an HTTP or FTP protocol. A data transfer would also end the flow 1019.

Figure 11:
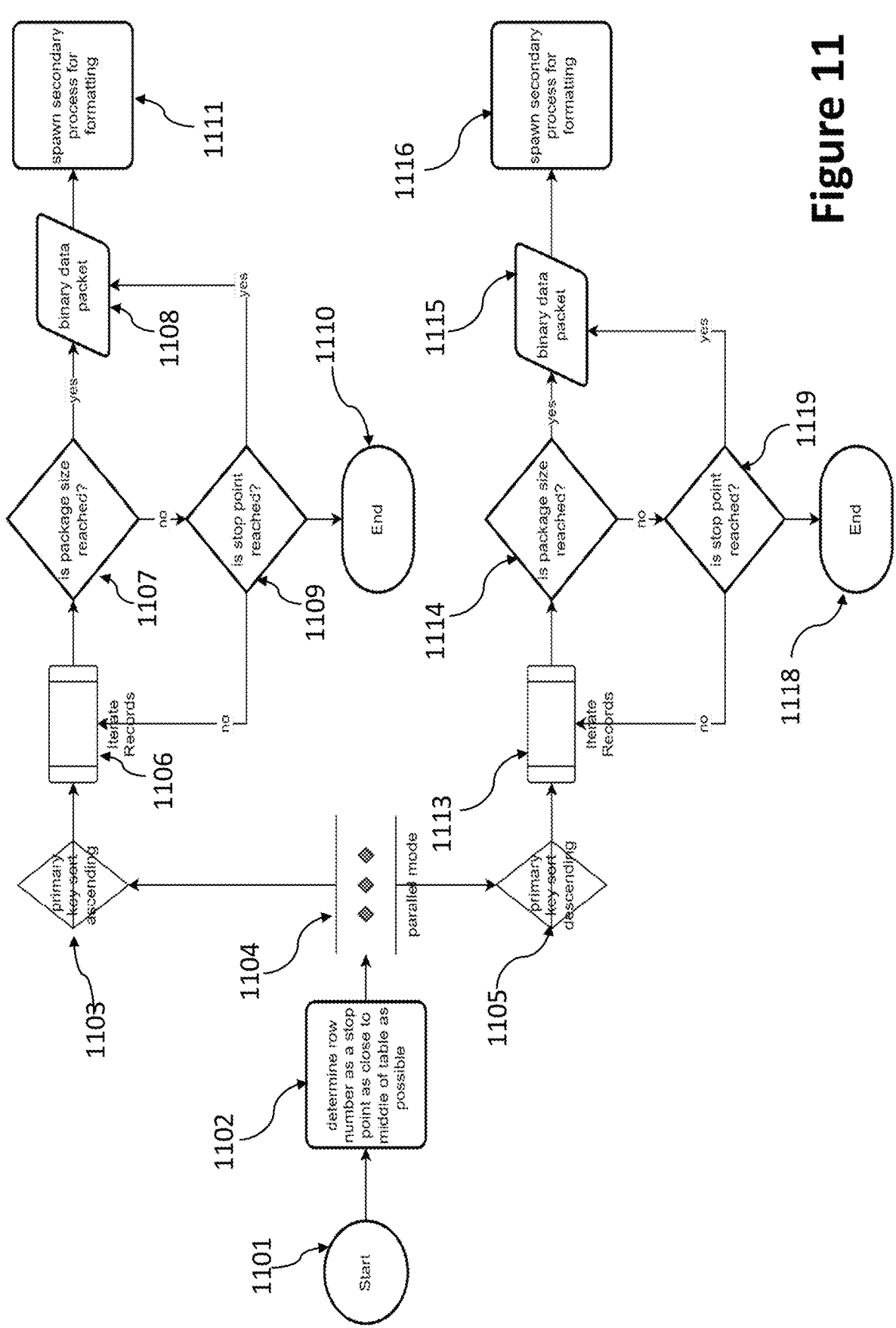
FIG. 11 illustrates a flow chart according to an embodiment of the present inventions.

FIG. 11 is a flow chart depicting an alternative implementation of the principles taught in FIG. 10. The main difference is that two iterators are used as opposed to just one, namely one forward iterator and one reverse iterator, such as broadly explained in FIG. 4. At process start 1101 a row number may be determined as a suitable stop point 1102. It is advantageous that the stop point is as close as possible to halfway point of the table. Once a stop point has been determined then a parallel junction may be processed 1104. A parallel junction signifies that the flow is split into two parallel branches which are executed at the same time. This may be achieved by calling two remote procedure calls, each of which will constitute a distinct work process, or alternatively a distinct thread. The flow at 1103 coincides with the forward iterator, which sorts the table to be extracted in a primary key ascending sort order. Conversely the flow at 1105 sorts the table to be extracted in a primary key descending sort order. Next an iteration of records 1106 is started. An iteration may be commenced by giving a SELECT statement in SQL syntax to an underlying database management system for example, such as "SELECT*FROM [TABLE] ORDER BY [PRIMARY KEY] ASCENDING" for example. For each iteration a test may be carried out whether either a predetermined package size is reached 1107 (such as 50 records for example) and whether the end of the table is reached 1109. Reaching the end of the table means that the flows ends 1110. If the package size limit is reached, or if the end of a table is reached, then a secondary process for formatting may be spawned 1111. When a secondary work process is spawned then a binary data packet 1108 may be passed as an input parameter, such as an argument for a remote procedure call for example. Such binary data packet may be an in-memory representation of a record set, such as a cached record set for example. The size of such a binary record set may be either the pre-determined package size of a defined number of rows, or the remainder from the end point of the last packet to the end of the table, if smaller. A mirror process may take place for the branch corresponding to the reverse iterator 1105. The reverse iterator may start an iteration of records 1113. An iteration may be commenced by giving a SELECT statement in SQL syntax to an underlying database management system for example, such as "SELECT*FROM [TABLE] ORDER BY [PRIMARY KEY] ASCENDING" for example. For each iteration a test may be carried out whether either a predetermined package size is reached 1114 (such as 50 records for example) and whether the end of the table is reached 1119. Reaching the end of the table means that the flow ends 1118. If the package size limit is reached, or the end of a table is reached, then a secondary process for formatting may be spawned 1116. When a secondary work process is spawned then a binary data packet 1115 may be passed as an input parameter, such as an argument for a remote procedure call for example. Such binary data packet may be an in-memory representation of a record set, such as a cached record set for example. The size of such a binary record set may be either the pre-determined package size of a defined number of rows, or the remainder from the end point of the last packet to the end of the table, if smaller.

In the field of artificial intelligence predictive models can be transformed into lossless compressors and vice versa. The machine learning community has trained large and powerful self-supervised language models. Since these large language models exhibit impressive predictive capabilities, they are useful as strong compressors. Large language models are powerful general-purpose predictors. For example, Chinchilla 70B, while trained primarily on free text, compresses database extracts in CSV format better than prior art general purpose compression algorithm, beating compressors like GZIP or 7Zip respectively.

Embodiments of the invention have used arithmetic coding-based language model compressors, as well as two competitive general-purpose lossless compressors: gzip and its improvement LZMA2, used by the 7zip software. Both are based on Huffman coding and the Lempel-Ziv-Welch algorithm.

A preferred embodiment is using Chinchilla 70B as the language model compressor, which has a finite context of roughly 10 kB. Chinchilla is a family of large language models developed by the research team at DeepMind. It belongs to the transformer family. A transformer is a deep learning architecture that relies on the parallel multi-head attention mechanism. Alternative embodiments have been implemented with the GPT-3 model as well as n-gram based based models. One of the earliest approaches for building a language model is based on the n-gram. An n-gram is a contiguous sequence of n items from a given text sample. However, n-gram language models have been largely superseded by neural language models. Neural networks represent words distributedly as a non-linear combination of weights. Large Language Models (LLMs) are neural language models working at a larger scale.

Input text is split into n-grams encoded as tokens and each token is converted into a vector via looking up from a word embedding table. At each layer, each token is then contextualized within the scope of the context window with other (unmasked) tokens via a parallel multi-head attention mechanism allowing the signal for key tokens to be amplified and less important tokens to be diminished.

The present inventors have made contributions to the art by introducing table specific fine-tuning and by optimizing tokenization for processing tabular data.

The inventors have found it advantageous that for compression of tabular data the generic language model is fine-tuned first with a large amount of generic, yet table specific sample data. In a second, optional, step fine tuning may be effected with feeding a chunk of the actual table which requires compression as training data into the fine tuning of the language model.

Fine-tuning is an approach to transfer learning in which weights of a pre-trained model are further trained on new data. Transfer learning refers to the practice of applying knowledge gained while solving one task to a related task. Fine-tuning can be done on the entire neural network or only a subset of its layers. Generally, it involves introducing a new set of weights connecting the language model's final layer to the downstream task's output. The original weights of the language model are kept frozen The inventors have found it particularly useful to use generative adversial networks (GANs) to synthetically produce useful training data for the language models used for data compression in one embodiment. A longstanding problem in the art is that training data useful for language modelling is most often confidential. Hence it is prohibited by legal restrictions that any actual customer data may become part of the model. The inventors have found that by applying differential privacy and k-anonymity to actual customer data, such data then can be used for machine learning purposes. Differential privacy is especially important in that context because many fields in a business database relate to numbers of one kind or another. Whilst, for confidentiality reasons, the numbers in the training data need to be synthethic, they nevertheless need to show the same statistical patterns which would show up in the real data. Differential privacy for training a language model to be later used for compression of tabular data can best be achieved by GANs.

Certain embodiments have created a generative, probabilistic neural network on a dataset grouped by table name, in the sense of both synthetic, and differentially private synthetic datasets of exactly the same size and distribution for each table. The result is that the statistical value of any numbers in the same rows of the same table should very closely resemble that of the original dataset, whilst privacy is guaranteed.

A GAN is composed of two neural networks: a generator network and a discriminator network. The generator network generates new data based on a random input, while the discriminator network distinguishes between real and generated data.

For such compressors with finite contexts, there are two approaches known in the prior art to compress sequences that are longer than the context length: (i) slide the compressor byte by byte, thus always processing a history of the previous C−1 bytes when compressing a new byte, and (ii) chunk the data stream into S sequences of C bytes and evaluate the in-context compression (without any history) averaged across batches. In a preferred embodiment all datasets were chunked into sequences of 2048 bytes and fed to the compressors one-by-one.

The size of a program for classical compressors is very small (a few kilobytes at most) and thus barely affects the compression rate. In contrast, language models suffer a huge loss in compression rate due to their large size, which cannot be offset when compressing less than around 1 TB of data.

Chinchilla models, while trained primarily on text, also appear to be general-purpose compressors, as they outperform all other compressors, even on image and audio data. Note that Chinchilla models have not been trained on this kind of data. Thus, Chinchilla models achieve their compression performance by conditioning a meta-trained model to a particular task at hand via in-context learning.

Figure 12:
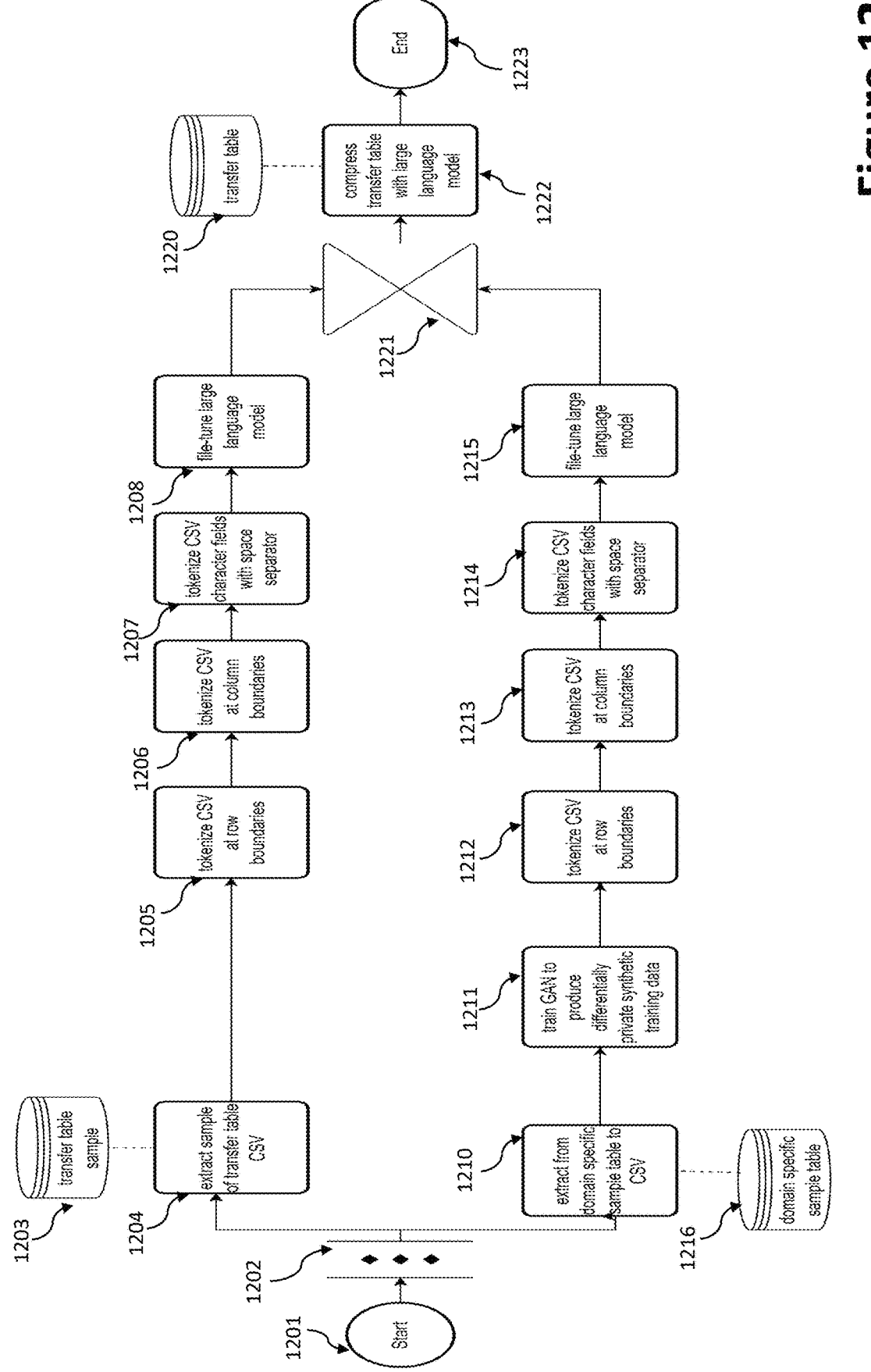
FIG. 12 illustrates a flow chart according to an embodiment of the present inventions.

FIG. 12 depicts a flow chart showing an embodiment which is depicting a compression of tabular data using a Large Language Model. Such compression is particular advantageous when applied to the compression steps earlier depicted as 807 and 805 in FIG. 8. The flow starts with 1201 and enters a parallel mode at 1202. Step 1210 extracts data from a domain specific sample table 1216. The data extraction is programmed in such a way that a text-based format, such as CSV in a preferred embodiment, is produced. With step 1211 a GAN is trained to produce differentially private synthetic training data 1211. Step 1212, and analogous step 1205, tokenize the text-based table extract, normally a CSV, at the marker which is a row boundary. In a CSV file, normally a carriage/line return signifies such a row boundary. Other markers can be used also. Step 1213, and analogous step 1206, tokenizes the text-formatted tabular data, normally CSV, at column boundaries, which are normally signified by a comma character. Other characters are also possible. Step 1214, and analogous step 1206, tokenizes CSV character fields with space separators. This includes embodiments which have other text formats than CSV. A character field related to a text string field (both variable and fixed-size) in the database schema of either the tables 1203 or 1216. In a preferred embodiments string fields are tokenized at the SPACE character, other characters are possible, in particular in whitespace characters. Steps 1208 and 1215 stand for fine tuning a large language model (LLM) with the tokenized table-specific data extracts (i.e. a CSV-format string in certain embodiments). Step 1221 stands for a collation of the results of the parallel branches, specifically in that case that a LLM has been fine-tuned with both an extract from a transfer table sample 1203 and with a domain specific sample table 1216. The invention may be practiced with just either one of the parallel branches in isolation, but the inventors have found it particularly advantageous to fine tune the LLM with both sets of training data. However, the question whether both parallel branches are advantageous is also one of hardware considerations. Normally training the LLM on the transfer table sample 1203 would require that one or more GPUs (graphics processing units) are available for this process step. This is because training LLMs efficiently normally required the availability of GPUs, as opposed to CPUs (central processing units). Training an LLM with just CPUs may be possible in the sense that a correct result is reached eventually, however it may negate the incentive for using LLMs for compressing tabular data, namely an improvement in performance over non-LLM based compression, such a 7ZIP or GZIP. Generally speaking when GPU processing power is available, then the invention is most efficiently practiced with lossless compression being handled by LLMs in the manner described, and when only CPU processing power is available, then non-LLM based conventional lossless compression (e.g. 7ZIP or GZIP) is most advantageous for compressing tabular data in the described embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Definitions and Clarifications

Herein below are a few definitions and clarifications. As used herein:

The terms "a" and "an", when modifying a noun, do not imply that only one of the noun exists.

The term "comprise" (and grammatical variations thereof) shall be construed broadly, as if followed by "Without limitation". If A comprises B, then A includes B and may include other things.

The term "e. g." means including without limitation. The fact that an "example" or multiple examples of something are given does not imply that they are the only instances of that thing. An example (or a group of examples) is merely a non-exhaustive and non-limiting illustration.

The term "include" (and grammatical variations thereof) shall be construed broadly, as if followed by "Without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored

The invention claimed is:

1. A method of distributing tabular data from a source relational database over a network to a remote subscriber computer, the method comprising:

providing a database extractor application to a subscriber for installation on the remote subscriber computer;

preparing transmission packets at a transmission server wherein said packets comprise tabular data from one or more relational tables sourced from a source relational database, the transmission server comprising a microprocessor and a memory that stores the remote subscriber's preferences for a destination address and for a set of tables subject to extraction, wherein the microprocessor counts a total number of records in a source table, wherein said source table is comprised in said one or more relational tables, iterates said source table, wherein a primary key sort order is used for iterating, spawns a plurality of secondary work processes, wherein a secondary work process is spawned when said iterating has iterated through a predetermined number of records, and wherein said spawning comprises passing a binary representation of said records to said secondary work process, wherein said secondary work process:

formats said binary data packet as text, resulting in a formatted data packet;

compresses one or more formatted data packets into a transmission packet, and transmits the transmission packet over an Internet-protocol communication channel to a connected device associated with the subscriber computer based upon the destination address;

wherein receipt of a transmission packet causes the database extractor application to:

extract contents of said transmission packet to a destination table in a destination relational database.

* * * * *